(12) United States Patent
Dally et al.

(10) Patent No.: US 11,886,980 B2
(45) Date of Patent: Jan. 30, 2024

(54) NEURAL NETWORK ACCELERATOR USING LOGARITHMIC-BASED ARITHMETIC

(71) Applicant: NVIDIA Corporation, Santa Clara, CA (US)

(72) Inventors: William James Dally, Incline Village, NV (US); Rangharajan Venkatesan, San Jose, CA (US); Brucek Kurdo Khailany, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1195 days.

(21) Appl. No.: 16/549,683

(22) Filed: Aug. 23, 2019

(65) Prior Publication Data

US 2021/0056397 A1   Feb. 25, 2021

(51) Int. Cl.
*G06N 3/06* (2006.01)
*G06N 3/063* (2023.01)
*G06F 17/16* (2006.01)
*G06F 7/483* (2006.01)

(52) U.S. Cl.
CPC ........... *G06N 3/063* (2013.01); *G06F 7/4833* (2013.01); *G06F 17/16* (2013.01)

(58) Field of Classification Search
CPC ........ G06N 3/063; G06N 3/045; G06N 3/084; G06F 7/4833; G06F 17/16; G06F 7/556
See application file for complete search history.

(56) References Cited

U.S. PATENT DOCUMENTS

| | | |
|---|---|---|
| 5,944,774 A | 8/1999 | Dent |
| 2019/0164043 A1 | 5/2019 | Litvak et al. |
| 2020/0073912 A1 | 3/2020 | Hiroi et al. |
| 2021/0256363 A1 | 8/2021 | Nair et al. |

OTHER PUBLICATIONS

J. N. Mitchell, "Computer Multiplication and Division Using Binary Logarithms," in *IRE Transactions on Electronic Computers*, vol. EC-11, No. 4, pp. 512-517, Aug. 1962.
(Continued)

*Primary Examiner* — Xiao En Mo
(74) *Attorney, Agent, or Firm* — Leydig, Voit & Mayer, Ltd.

(57) ABSTRACT

Neural networks, in many cases, include convolution layers that are configured to perform many convolution operations that require multiplication and addition operations. Compared with performing multiplication on integer, fixed-point, or floating-point format values, performing multiplication on logarithmic format values is straightforward and energy efficient as the exponents are simply added. However, performing addition on logarithmic format values is more complex. Conventionally, addition is performed by converting the logarithmic format values to integers, computing the sum, and then converting the sum back into the logarithmic format. Instead, logarithmic format values may be added by decomposing the exponents into separate quotient and remainder components, sorting the quotient components based on the remainder components, summing the sorted quotient components to produce partial sums, and multiplying the partial sums by the remainder components to produce a sum. The sum may then be converted back into the logarithmic format.

20 Claims, 14 Drawing Sheets

(56) References Cited

OTHER PUBLICATIONS

M. S. Kim, A. A. D. Barrio, L. T. Oliveira, R. Hermida and N. Bagherzadeh, "Efficient Mitchell's Approximate Log Multipliers for Convolutional Neural Networks," in *IEEE Transactions on Computers*, vol. 68, No. 5, pp. 660-675, May 1, 2019.

Daisuke Miyashita, Edward H Lee, and Boris Murmann. Convolutional neural networks using logarithmic data representation. arXiv preprint arXiv:1603.01025, 2016.

E. H. Lee, D. Miyashita, E. Chai, B. Murmann and S. S. Wong, "LogNet: Energy-efficient neural networks using logarithmic computation," *2017 IEEE International Conference on Acoustics, Speech and Signal Processing (ICASSP)*, New Orleans, LA, 2017, pp. 5900-5904.

J. Johnson, "Rethinking floating point for deep learning," arXiv preprint arXiv:1811.01721, 2018.

M. Chugh and B. Parhami, "Logarithmic arithmetic as an alternative to floating-point: A review," *2013 Asilomar Conference on Signals, Systems and Computers*, Pacific Grove, CA, 2013, pp. 1139-1143.

U.S. Appl. No. 16/750,917, filed Jan. 23, 2020.

U.S. Appl. No. 16/750,823, filed Jan. 23, 2020.

Meher, M., et al., "A High Bit Rate Serial-Serial Multiplier With On-The-Fly Accumulation by Asynchronous Counters," IEEE Trans. Very Large Scale Integr. (VLSI) Syst., vol. 19, No. 10, Oct. 2011, pp. 1722-1745.

Hennessy, J.L., et al., Computer Architecture, Fifth Edition: A Quantitative Approach, 5th ed. San Francisco, CA USA, Morgan Kaufmann Publishers, Inc. 2011.

Hennessy, J.L., et al., Computer Architecture: A Quantitative Approach, 2003, Elsevier Science and Technology, 3rd Ed. pp. 609-611, Retrieved from ProQuest Ebook Central, 2014.

Marston, R., "Up and up/down counters," in CMOS Circuits Manual, London: Heinemann, 1987, ch. 8, pp. 133-151.

Sze, V., Efficient Processing of Deep Neural Networks: from Algorithms to Hardware Architectures (PowerPoint Slides), Available: https://eyeriss.mit.edu/2019_neurips_tutorial.pdf (2019).

Chen, Y., et al., "Eyeriss: A Spatial Architecture for Energy-Efficient Dataflow for Convolutional Neural Networks," In 2016 ACM/IEEE 43rd Annual International Symposium on Computer Architecture (ISCA), 2016, pp. 367-379.

NEURAL NETWORK ACCELERATOR USING LOGARITHMIC-BASED ARITHMETIC

TECHNICAL FIELD

The present disclosure relates to logarithmic-based arithmetic, and, more specifically, to using logarithmic-based arithmetic for neural network computations.

BACKGROUND

Performing accurate dot product calculations or other operations, such as a multiply-accumulate operation that requires computing a sum of products, can be expensive in terms of energy when implemented in circuitry. As the number of bits used to represent each value increases, more energy and/or time is needed to complete the calculation and produce an accurate result. There is a need for addressing these issues and/or other issues associated with the prior art.

SUMMARY

Neural networks, in many cases, include convolution layers that are configured to perform many convolution operations that require multiplication operations to generate products that are subsequently summed to produce a result. Compared with performing multiplication on integer, fixed-point, or floating-point format values, performing multiplication on logarithmic format values is straightforward and energy efficient as the exponents are simply added. However, adding logarithmic format values is more complex. Conventionally, addition is performed by converting the logarithmic format values to integers, computing the sum, and then converting the sum back into the logarithmic format. Instead, logarithmic format values may be added by decomposing the exponents into separate quotient and remainder components, sorting the quotient components based on the remainder components, summing the sorted quotient components to produce partial sums, and multiplying the partial sums by the remainder components to produce a sum of the logarithmic format values in integer format. The sum may then be converted back into the logarithmic format.

A method and system are disclosed for accumulating values represented in a logarithmic format. A plurality of input values are received by a partial sums generation unit for an addition computation, where each input value in the plurality of values is represented as a quotient component $e_q$ and a remainder component $e_r$, such that each input value $$v = s2^{(e_q + \frac{e_r}{n})},$$

where n is an integer and a signs is +1 or −1. The partial sums generation unit generates a set of partial sums by sorting the quotient component for each input value according to the remainder component for the input value. An addition unit sums the partial sums in the set of partial sums to produce a result that is the sum of the plurality of input values in a logarithmic format.

In an embodiment, the system includes a processor comprising a partial sums generation unit and an addition unit. The partial sums generation unit configured to receive a plurality of input values for an addition computation, wherein each input value in the plurality of input values is represented as a quotient component $e_q$ and a remainder component $e_r$, such that each input value $$v = s2^{(e_q + \frac{e_r}{n})},$$

and generate a set of partial sums by sorting the quotient component for each input value according to the remainder component for the input value. The addition unit is configured to sum the partial sums in the set of partial sums to produce a result that is a sum of the plurality of input values.

DETAILED DESCRIPTION

Numbers may be represented in a logarithmic format, where a value v is encoded as a sign bit s=sign(v) and an exponent field $e=\log_b(v)$. For binary numbers, the logarithmic format has the advantage of having a maximum quantization error that is proportional to the magnitude of the number being represented. The maximum quantization error is determined by the number of bits used to perform an arithmetic computation. Reducing the number of bits increases the quantization error and also usually reduces the energy (e.g. power) consumed by circuitry performing the arithmetic computation. When integers are used to represent numbers, the relative quantization error is not uniform across the range of values. Instead, the relative quantization error increases as the magnitude of the number decreases. Therefore, a logarithmic representation is particularly advantageous when values having small magnitudes are accumulated because the quantization error will be reduced.

Multiplying logarithmic numbers is straightforward. To multiply $(s_1, e_1)$ and $(s_2, e_2)$, the product $(s_p, e_p)$ is computed as:

$$s_p = s_1 \oplus s_2$$

$$e_p = e_1 + e_2$$

Adding two numbers $(s_1, e_1)+(s_2, e_2)$ generally requires converting to an integer representation, performing the addition operation and then converting the sum back into the logarithmic format. However, restricting the logarithmic format can simplify the addition operation.

When the base of the logarithmic format is restricted to be of the form $b=2^{1/n}$ for an integer n, the value $v=s2^{e/n}$. The exponent can be decomposed or separated into an integer quotient component $e_q$ and a remainder component $e_r$, so that $$v = s2^{(e_q + \frac{e_r}{n})}, \text{ where } e_q = \text{floor}\left(\frac{e}{n}\right)$$

and $e_r = e - e_q n$. When n is a power of 2, the least-significant bits of the exponent are the remainder component and the most-significant bits of the exponent are the quotient component. When a neural network model is configured for inferencing, many of the inputs to the convolutional layers are small values that may be represented in a logarithmic format using n=4, 8, or 16 while maintaining an accuracy equivalent or better compared with an integer format represented using 8 bits.

Figure 1A:
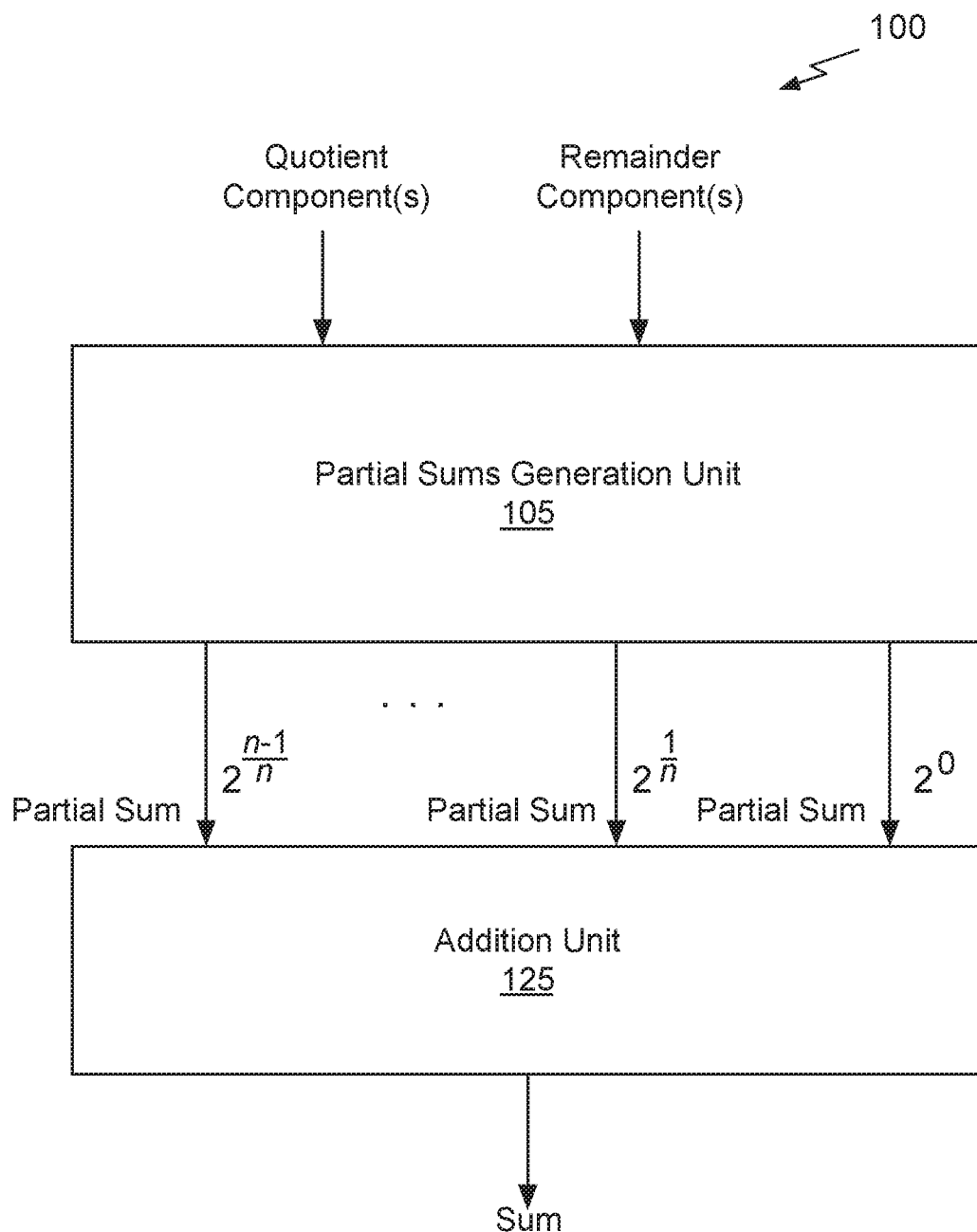
FIG. 1A illustrates a block diagram of a system for accumulating input values represented in a logarithmic format, in accordance with an embodiment.

FIG. 1A illustrates a block diagram of a system 100 for accumulating input values represented in a logarithmic format, in accordance with an embodiment. The system 100 includes a partial sums generation unit 105 and an addition unit 125. Decomposing each input value in the logarithmic format into a quotient component $e_q$ and a remainder component $e_r$ enables an inexpensive conversion of the input values to an integer representation for accumulation to compute the sum of a series of numbers. The quotient and remainder components of the input values in the logarithmic format are processed by the partial sums generation unit 105 to produce partial sums. The addition unit 125 adds the partial sums together to produce the sum of the input values.

Conventionally, to convert the input values into integer format before summing the input values, each contribution of a quotient component for an input value is scaled by the remainder component for the input value. The scaled contributions are then accumulated to produce the sum. Even though multiplying the remainder components and quotient components can be accomplished by a shift operation, eliminating the shift operation for every input value reduces energy consumption, especially when the number of input values is large. The scaled contributions should be represented by a number of bits sufficient to prevent the approximation error from being large compared to the quantization error of the logarithmic format. Another drawback of the conventional technique is that, during the conversion and accumulation operations, many of the bits toggle, thereby consuming energy.

In contrast with the conventional technique, the required work to compute the sum of a series of numbers can be reduced by computing separate partial sums for each possible value of the remainder component. When separate partial sums are computed for each possible value of the remainder component, the numbers being summed have only a single bit set to "one" and, with the average carry propagation being one bit position, very few bits toggle to compute the separate partial sums. Therefore, energy consumption is reduced compared with the conventional technique.

The partial sums generation unit 105 defers scaling by the remainder components and instead sorts the contributions of quotient components according to the remainder components and accumulates the contributions separately. Therefore, instead of a single large accumulator, multiple accumulators are used and an n-way accumulation of the partial sums is performed once for each sum. For each possible value of the remainder components, a partial sum of the contributions for the quotient components is accumulated by one of the smaller accumulators within the partial sums generation unit 105. The number of possible remainder component values equals n. In an embodiment, n=4, 8, or 16. When n=8, the possible values of the remainder components are constants $2^0$, $2^{1/8}$, $2^{1/4}$, $2^{3/8}$, $2^{1/2}$, $2^{5/8}$, $2^{3/4}$, and $2^{7/8}$. Therefore, when n=8, eight partial sums are accumulated within the partial sums generation unit 105. The contribution for each quotient component is a leading-one left-shifted by $e_q$ (e.g., $1<<e_q$). Compared with the conventional technique, the shift operation performed for every input value used in the conventional technique is replaced with n multiplication operations, performed only once after the n partial sums are computed.

Described another way, the contributions for the quotient components are separately accumulated in buckets, where each bucket corresponds to a different remainder component value. The partial sums generation unit 105 distributes the quotient components to buckets according to the remainder components. After the quotient component contributions are accumulated in each bucket for all of the input values, the sum in each bucket is multiplied by the corresponding remainder component value (e.g., one of the constants) to produce the partial sums that are output by the partial sums generation unit 105. The partial sums are then summed by the addition unit 125 to produce the result (sum) in integer (linear) format.

In an embodiment, to reduce toggling bits during the accumulation of the quotient contributions, quotient contributions for positive input values (the sign s is positive) are accumulated separately from quotient contributions for negative input values. Separate accumulation produces n positive partial sums and n negative partial sums that are summed by the addition unit 125 to produce the result. In an embodiment, the negative partial sums are represented as positive numbers during accumulation and then converted into negative numbers represented in twos complement format before being input to the addition unit 125.

Although the system 100 is described in the context of processing units, one or more of the partial sums generation unit 105 and the addition unit 125 may be implemented as a program, custom circuitry, or by a combination of custom circuitry and a program. For example, the partial sums generation unit 105 may be implemented by a GPU (graphics processing unit), CPU (central processing unit), or any processor capable of implementing layers of a neural network. Furthermore, persons of ordinary skill in the art will understand that any system that performs the operations of the system 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
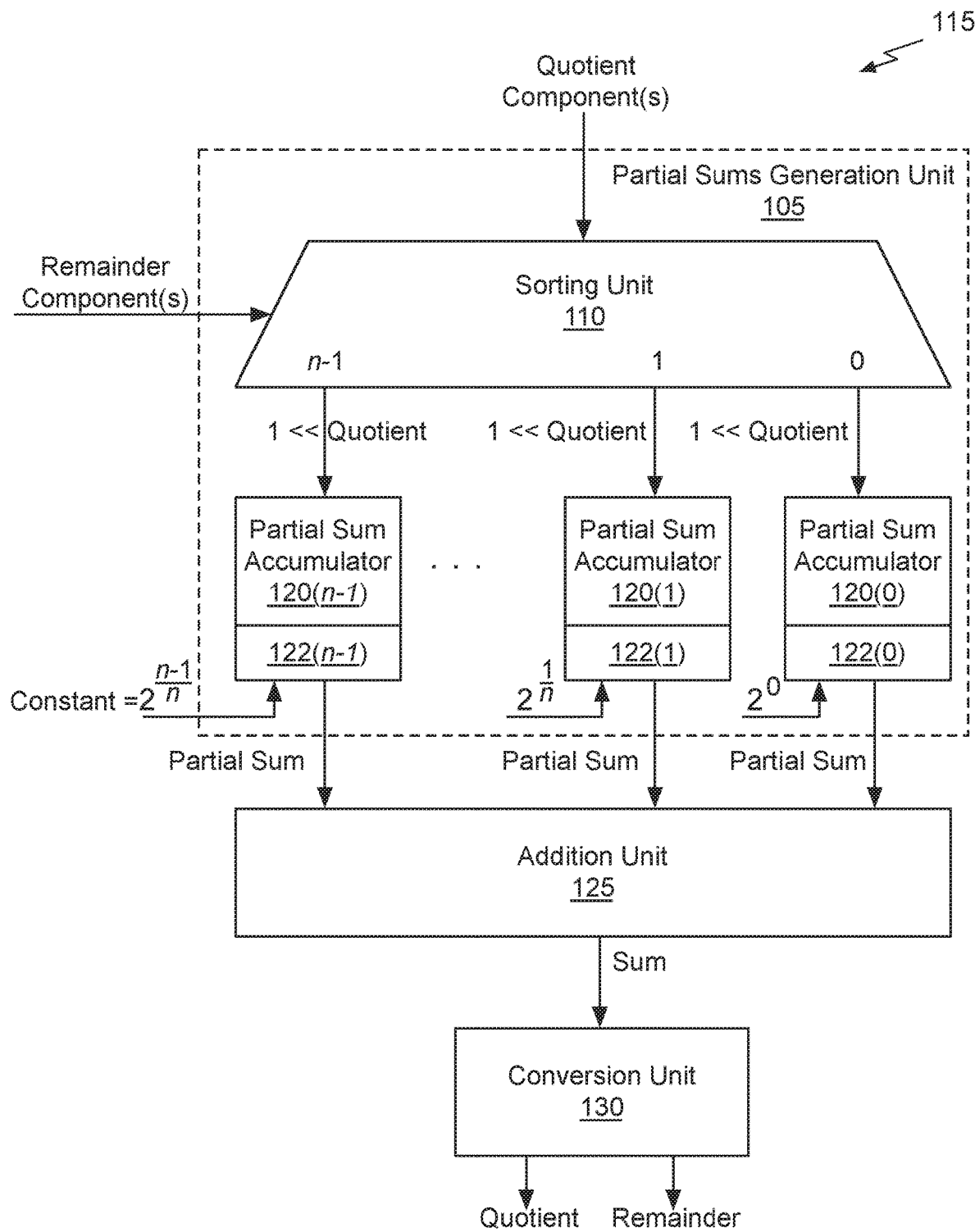
FIG. 1B illustrates another block diagram of the system for accumulating input values represented in a logarithmic format, in accordance with an embodiment.

FIG. 1B illustrates another block diagram of a system 115 for accumulating values represented in a logarithmic format, in accordance with an embodiment. The system 115 includes the partial sums generation unit 105, the addition unit 125, and a conversion unit 130. As shown in FIG. 1B, a sorting unit 110 within the partial sums generation unit 105 distributes each quotient component for an input value to one of the partial sum accumulators 120 (buckets) according to the remainder component for the input value. Because there are n possible values of the remainder component, the quotient components are routed into n separate partial sum accumulators 120 to generate the set of partial sums. In an embodiment, the sorting unit 110 is implemented in circuitry as an n-way demultiplexor.

When the quotient component for an input value is sorted, a binary one is shifted left by the quotient component to produce a quotient contribution ($1<<e_q$) that is routed to one of the partial sum accumulators 120 according to the remainder component $e_r$ for the input value. In an embodiment, the left-shift operation is implemented as a combinational shifter.

One of the n partial sum accumulators 120 is enabled or selected by the remainder component for each input value. For example, using n=8, for a first input value with $e_q$=4'b0010 (integer number 2) and $e_r$=3'b100 (integer number 4), a first quotient contribution, $1<<e_q$=4'b0100 is routed to the partial sum accumulator 120(4). When a second input value with $e_q$=4'b0011 (integer number 3) and $e_r$=3'b100 (integer number 4) is received, a second quotient contribution, $1<<e_q$=4'b1000 is routed to the partial sum accumulator 120(4). The first quotient contribution and the second quotient contribution are summed by the partial sum accumulator 120(4) to produce a partial sum. Note, when n separate partial sum accumulators 120 are accumulated to produce the partial sums, the quotient contributions being summed have only a single bit set to a one and, because the average carry propagation is one bit position, very few bits toggle within each selected partial sum accumulator 120 to compute the separate partial sums. In an embodiment, each partial sum accumulator 120 is implemented as a carry-propagate adder circuit.

The quotient component for each input value may be sorted serially, with one of the partial sum accumulators 120 receiving a contribution for each input value. When the quotient components and remainder components for the input values are available simultaneously, the quotient components may be sorted in parallel. The contributions for the quotient components may be accumulated serially or, if the partial sum accumulators 120 are configured to accumulate multiple input values, at least a portion of the contributions may be accumulated in parallel by the partial sum accumulators 120.

After all of the input values are processed by the sorting unit 110 and the contributions for the quotient components are accumulated by the partial sum accumulators 120, each partial sum is scaled by a respective constant (remainder component) to produce the set of partial sums for output to the addition unit 125. As shown in FIG. 1B, a multiplier 122 scales the output of each partial sum accumulator 120 by a respective constant to produce the set of partial sums. The constant is included in n constants $c_i=2^{i/n}$ for $i \in \{0 \ldots n-1\}$ and the remainder component determines the constant by which each partial sum is scaled. In other words, each of the n constants corresponds to a particular partial sum accumulator 120 that produced the partial sum associated with the constant. For example, when n=8 the partial sum accumulated in the partial sum accumulator 120(4) is scaled by the constant $2^{1/2}$, thereby scaling all of the quotient contributions associated with $e_r$=3'b100 by $2^{1/2}$. The quotient components effectively determine the amount by which the corresponding constant is shifted.

The set of partial sums are summed by the addition unit 125 to produce the result (sum) in integer format. In an embodiment, the addition unit 125 is implemented as a carry-propagate adder circuit. The sum is converted to logarithmic format by the conversion unit 130. Conventionally, conversion from integer to logarithmic format generally requires taking the logarithm which can be an expensive process. However, by restricting the choice of the logarithmic base b to be $b=2^{1/n}$ for n a power of 2, the conversion performed by conversion unit 130 is much simpler.

Given an integer m, the position of the leftmost (e.g., leading) 1 in m is determined by the conversion unit 130. The position is the quotient component of e, namely $e_q$. Then, the conversion unit 130 shifts m so that the leading 1 is in the leftmost bit (i.e., the leading zeros are removed) producing an aligned m. In an embodiment, the conversion unit 130 compares the aligned m to the n possible remainder values (constants) $c_i=2^{i/n}$, to determine the remainder component of e, namely $e_r$. The constant closest to the aligned bits of m determines the $e_r$. In another embodiment, the aligned m is input to a look-up table to determine the remainder component $e_r$. In yet another embodiment, a tree traversal is performed to successively compare the aligned m to a subset of constants to determine the remainder component $e_r$.

To find the closest constant, conversion unit 130 may compare the aligned m with the (n−1) midpoints $d_i$ between the constants, where $$d_i = \frac{c_i + c_{i+1}}{2}.$$

The n−1 comparisons can be performed in parallel. The conversion unit 130 examines each comparison result to find the transition from 0 to 1. In another embodiment, the conversion unit 130 performs a binary search of the aligned m with the midpoints, requiring $\log_2 n$ comparisons to find the closest constant. When converting the integer format sum back to logarithmic format after a long summation—as may be performed within a neural network—the conversion latency is not critical, because only one conversion is typically performed for thousands of multiplication and addition operations.

Figure 1C:
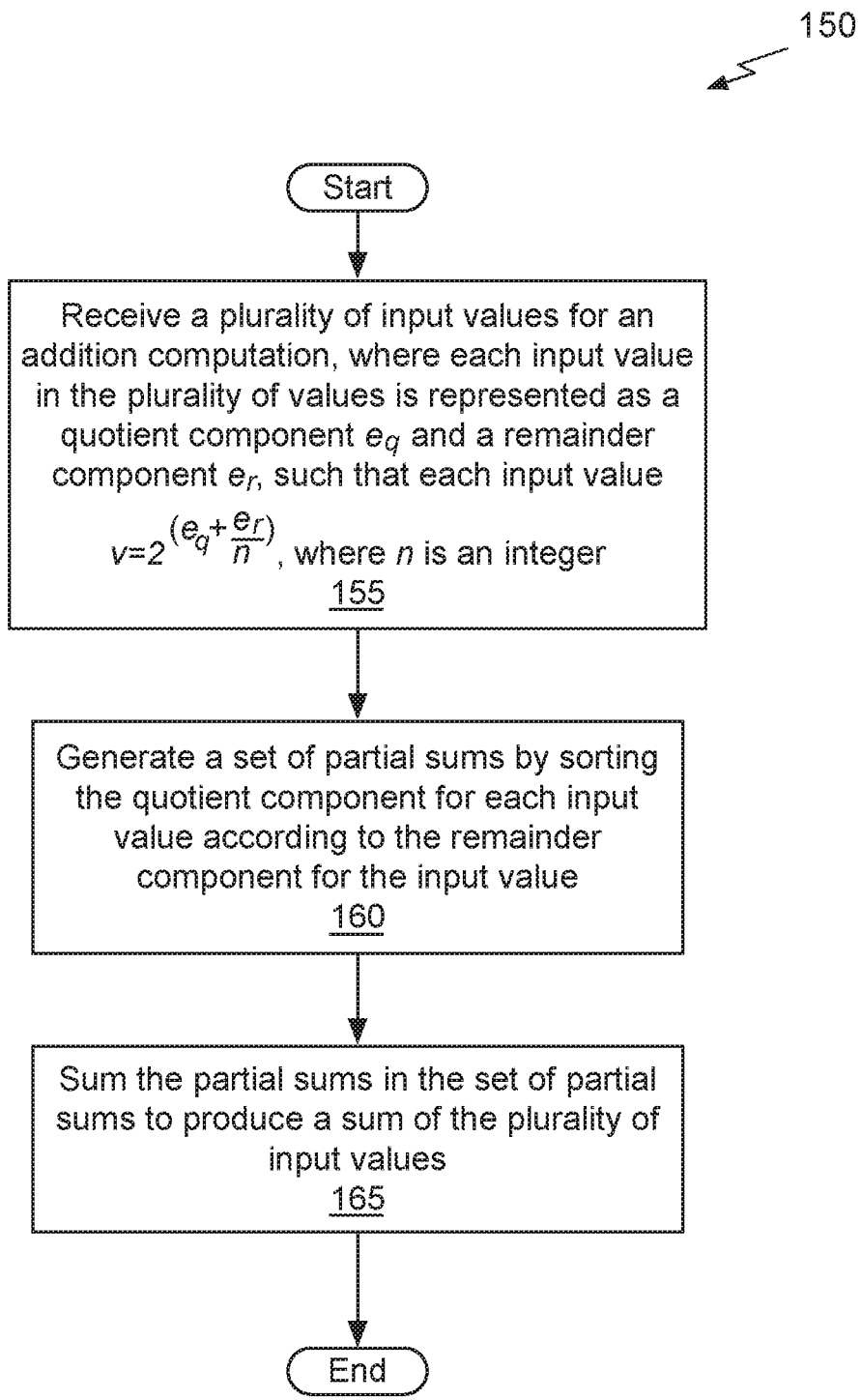
FIG. 1C illustrates a flowchart of a method for accumulating input values represented in a logarithmic format, in accordance with an embodiment.

FIG. 1C illustrates a flowchart of a method 150 for accumulating values represented in a logarithmic format, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of computing the sum, such as the system 100 or 115. Furthermore, persons of ordinary skill in the art will understand that any system that performs method 150 is within the scope and spirit of embodiments of the present disclosure.

At step 155, a plurality of input values is received for an addition computation. Each input value in the plurality of values is represented as a quotient component $e_q$ and a remainder component $e_r$, such that each input value $$v = s2^{\left(e_q + \frac{e_r}{n}\right)},$$

where n is an integer and the sign s is +1 or −1. In an embodiment, the input values are received by the partial sums generation unit 105. In an embodiment, n is a power of two. In an embodiment, the plurality of input values are products computed as part of a convolution operation. In an embodiment, the plurality of input values and the sum are computed as an operation implemented within a neural network model.

At step 160, a set of partial sums is generated by sorting the quotient component for each input value according to the remainder component for the input value. In an embodiment, the partial sums generation unit 105 generates the set of partial sums. To sum a series of p logarithmic format input values v, $\Sigma_{i=0}^{p-1} v_i$, n partial sums $S_i$ are computed, one for each possible remainder component value. Only the quotient component contributions of the exponents are summed initially, and the accumulated quotient component contributions are multiplied by the respective remainder component values, $s2^{i/n}$ after the partial sums are accumulated:

$$S_i = s2^{i/n} \Sigma_{p:e_{rp}=i} 2^{e_{qp}}.$$

The partial sums are then accumulated to produce the sum $$S = \Sigma_{i=0}^{n-1} S_i.$$

In an embodiment, each partial sum is multiplied by a respective remainder component value to produce the set of partial sums.

At step 165, the partial sums in the set of partial sums are summed to produce a sum of the plurality of input values. In an embodiment, the addition unit 125 receives the set of partial sums and produces the sum. Postponing multiplying by the remainder component of the exponents until after the partial sums are accumulated reduces the number of bits toggled. In an embodiment, the sums are converted from integer format to logarithmic format by the conversion unit 130.

In an embodiment, the conversion is performed by finding the leading one within the sum to determine the quotient component of the sum. The sum is shifted left to remove leading zeros and produce a portion of the sum including the leading one and less significant bits of the sum (e.g., an aligned integer). The conversion unit 130 compares the portion with (n−1) midpoints between the different constant (possible remainder component) values, effectively quantizing the portion to produce the sum remainder component. In an embodiment, an array of n−1 comparators within the conversion unit 130 compares the portion with the (n−1) midpoints in parallel. In an embodiment, the conversion unit 130 includes a find-first one circuit to identify the zero-to-one transition in the results of the parallel comparison and output $e_r$.

As the number of bits, n, used to represent the remainder component of the logarithmic format increases, the number of partial sums that are computed increases. Instead of increasing the number of partial sum accumulators 120, a hybrid approximation may be used to apply the approximation technique to the least-significant bits of the remainder component instead of the entire remainder component. The remainder component may be split such that $e_r = e_{rM} + e_{rL}$ and $$v = 2^{\left(e_q + \frac{e_{rM}}{n} + \frac{e_{rL}}{k}\right)},$$

where a base factor k is an integer and k>n and when n is a power of 2, k is a higher power of 2. In an embodiment, k is a multiple of n.

For the hybrid approximation, the Mitchell approximation technique may be used to approximate $$2^{\left(\frac{e_{rL}}{k}\right)} = 1 + x, \text{ where } x = \frac{e_{rL}}{k}$$

and x<1. The Mitchell approximation technique is described in J. N. Mitchell, "Computer Multiplication and Division Using Binary Logarithms," in *IRE Transactions on Electronic Computers*, vol. EC-11, no. 4, pp. 512-517, August 1962, the entire contents of which are incorporated herein by reference. The Mitchell approximation always overestimates the remainder component. However, the Mitchell approximation has the lowest error when x is nearest to either zero or one.

Figure 2A:
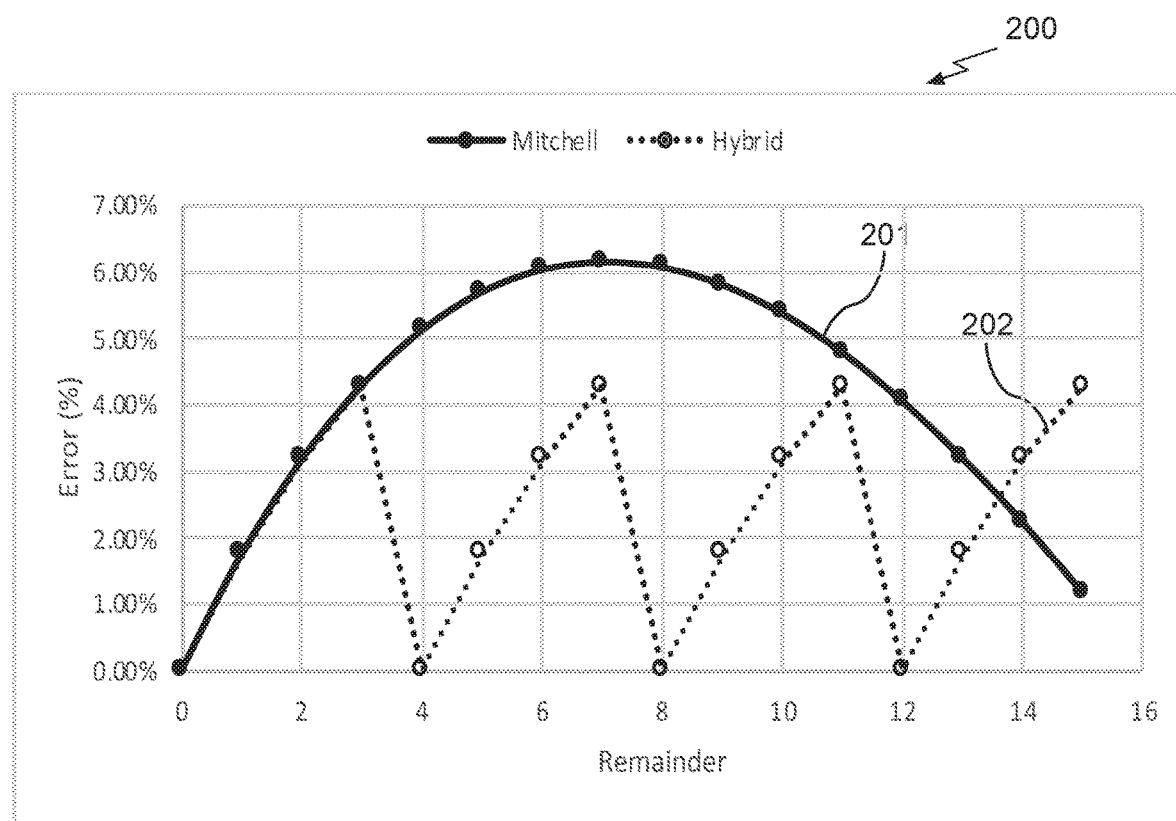
FIG. 2A illustrates a graph of errors for approximated values using a Mitchell approximation and a hybrid approximation technique, in accordance with an embodiment.

FIG. 2A illustrates a graph 200 of errors for approximated values using the Mitchell approximation and a hybrid approximation technique, in accordance with an embodiment. As shown FIG. 2A, when the Mitchell approximation is used to approximate the remainder component, the resulting error is the arc shape 201. Instead of applying the Mitchell approximation technique to the entire remainder component, a hybrid approximation technique may be used that applies the Mitchell approximation technique to only the least-significant portion of the remainder component. The resulting error for the hybrid approximation technique is shown by a sawtooth shape 202. The sawtooth shape 202 results when the partial sums generation unit 105 is modified to implement the approximation $$2^{\left(\frac{e_{rL}}{k}\right)} = 1 + x$$

for the least-significant 2 bits of a 4 bit remainder component, using n=4 (0<x<0.25) and a base factor k=16, x={0, 1/16, 2/16, and 3/16}. Overall, the error is less when the hybrid approximation is used to approximate only a portion of the remainder component instead of approximating the entire remainder component. When the hybrid approximation is used for the least-significant 2 bits of the 4 bit remainder component, only 4 partial sum accumulators 120 are needed to produce the set of partial sums instead of 16.

Figure 2B:
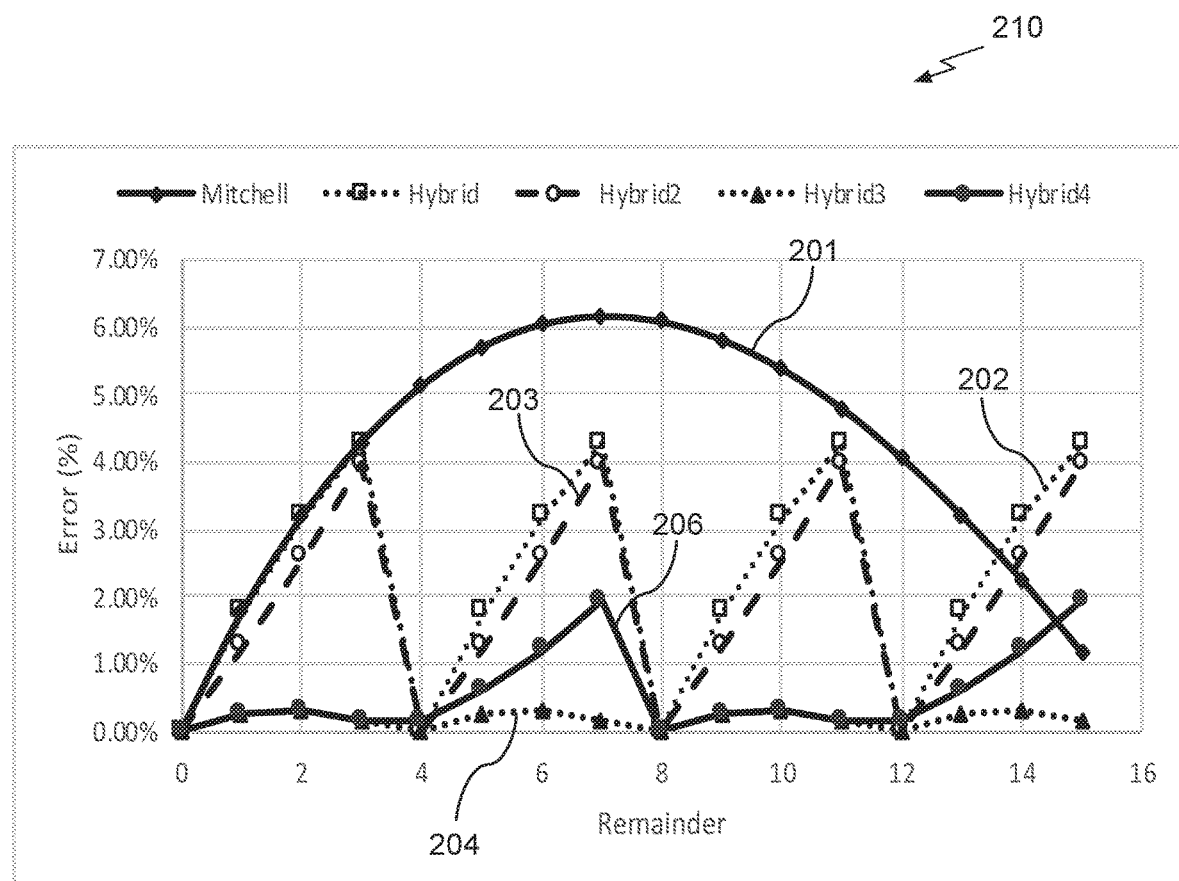
FIG. 2B illustrates another graph of errors for approximated values using the Mitchell approximation and the hybrid approximation technique, in accordance with an embodiment.

The hybrid approximation may be used to approximate the least-significant bits of the remainder component, $$2^{\left(\frac{e_{rL}}{k}\right)} = 1 + cx,$$

where c=1 to apply the Mitchell approximation and c<1 for the hybrid implementation. FIG. 2B illustrates the resulting error graph 210 for approximated values using a Mitchell approximation and the hybrid approximation technique, in accordance with an embodiment. When c=1, the accumulation operation is $(\Sigma_{i=0}^{n-1}((16+e_{rLi})<<e_{qi})>>4$.

The sawtooth shape 203 results when the partial sums generation unit 105 is modified to implement the approximation $$2^{\left(\frac{e_{rL}}{k}\right)} = 1 + cx$$

for the least-significant 2 bits of the remainder component (0<x<0.25) using c=½, n=4, and the base factor k=16.

The nearly flat shape 204 results when the partial sums generation unit 105 is modified to implement the approximation $$2^{\left(\frac{e_{rL}}{k}\right)} = 1 + cx$$

for the least-significant 2 bits of the remainder component using c=¾, n=4, and the base factor k=16. When c=¾, the accumulation operation is $(\Sigma_{i=0}^{n-1}((64+(e_{rLi}<<2)-e_{rLi})<<e_{qi}))>>6$.

The sawtooth shape 206 results when the partial sums generation unit 105 is modified to implement the approximation $$2^{\left(\frac{e_{rL}}{k}\right)} = 1 + cx$$

for the least-significant 3 bits of the remainder component using c=¾, n=2, and the base factor k=16. When the hybrid approximation is used for the least-significant 3 bits of the 4 bit remainder component, only 2 partial sum accumulators 120 are needed to produce the set of partial sums instead of 16. In each case, the hybrid approximation introduces less error overall compared with using the Mitchell approximation.

Figure 2C:
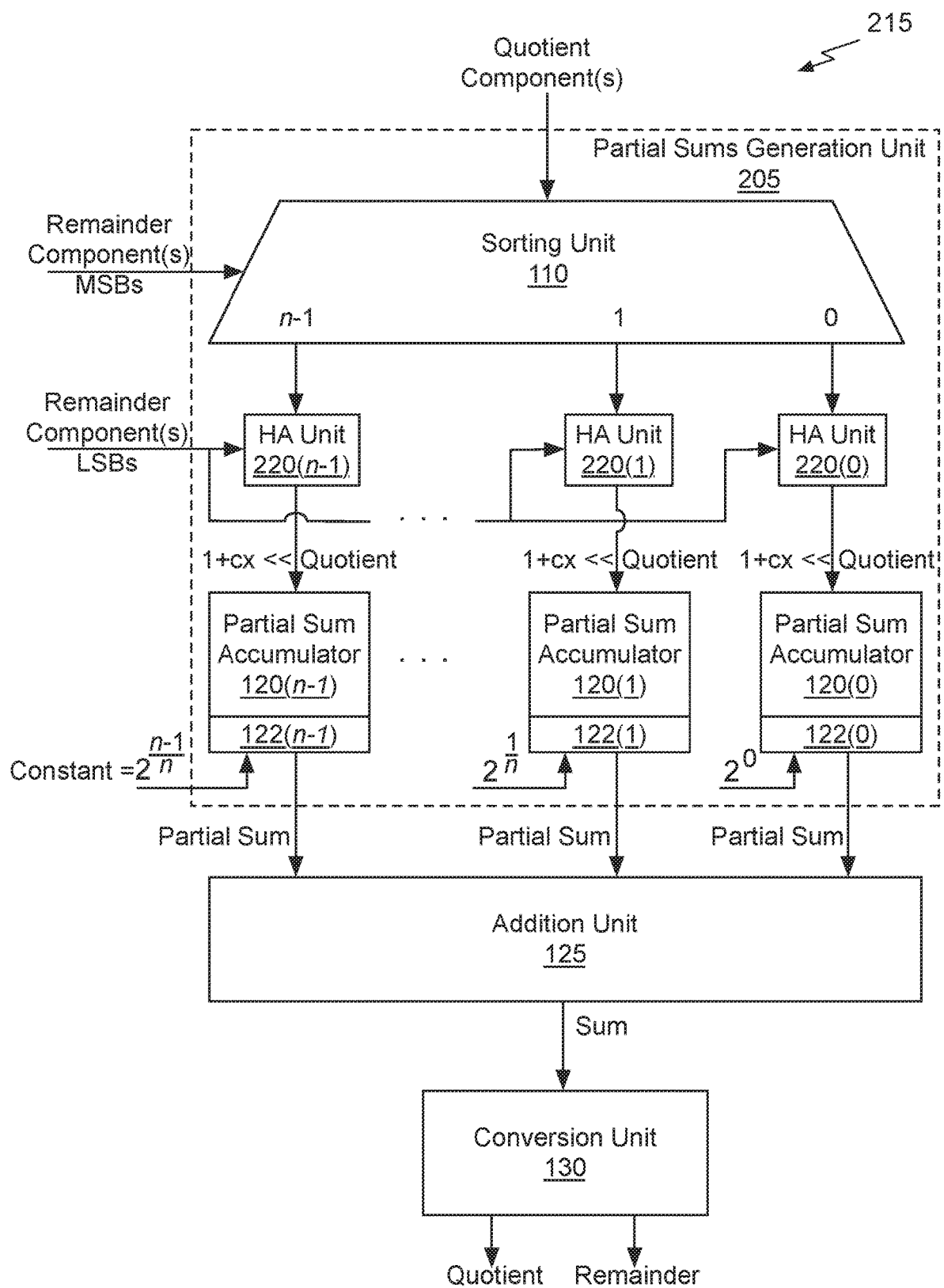
FIG. 2C illustrates a block diagram of another system for accumulating input values represented in a logarithmic format using an approximation technique, in accordance with an embodiment.

FIG. 2C illustrates a block diagram of a system 215 for accumulating values represented in a logarithmic format, in accordance with an embodiment. The system 215 includes a partial sums generation unit 205, the addition unit 125, and the conversion unit 130. As shown in FIG. 2C, the partial sums generation unit 205 includes the sorting unit 110 and the partial sum accumulators 120. However, a hybrid approximation (HA) unit 220 is included between the sorting unit 110 and each partial sum accumulator 120.

The set of partial sums is generated by sorting the quotient component for each input value according to the remainder component for the input value. Each remainder component $e_r$ is separated into a most-significant bit (MSB) portion $e_{rM}$ and a least-significant bit (LSB) portion or subset $e_{rL}$ including at least one or more LSBs. As shown in FIG. 2C, the sorting unit 110 distributes the input quotient components to the HA units 220 according to the MSB portion of the input remainder components. In an embodiment, k is greater than n and the quotient components are routed into n separate HA units 220 and partial sum accumulators 120 to generate the set of partial sums.

The HA units 220 receive the LSB portion of the input remainder components and generate an approximated value, 1+cx. Therefore, the LSB portion of the input remainder component is divided by the base factor k by the HA unit 220 to compute the approximated value. The subset of the remainder component is also multiplied by the scale factor c to produce a product that is summed with one to compute the approximated value. In an embodiment, the HA unit 220 implements a look up table to determine the approximated value. The look up table that contains an entry for each possible value of $e_{rL}$ with as many bits as needed to give a desired level of accuracy. For example, for an $e_{rL}$ of two bits, the look up table includes four entries and may be implemented as a 4-input multiplexer. The inputs to the multiplexer are fixed and gates are omitted for any input bit values of zero.

The approximated value is left-shifted by the quotient component, $(1+cx)<<e_q$, to produce modified quotient component contributions that are output to the corresponding partial sum accumulator 120. After the modified quotient component contributions are accumulated in each partial sum accumulator 120 for all of the input values to produce partial sums, the partial sum computed by each partial sum accumulator 120 are output to the multipliers 122. Each multiplier 122 scales the output of one of the partial sum accumulators 120 by the corresponding remainder component MSBs (e.g., one of the constants) to produce the set of partial sums for output to the addition unit 125. The set of partial sums are summed by the addition unit 125 to produce the result (sum) in integer format. The sum is converted to logarithmic format by the conversion unit 130.

Figure 2D:
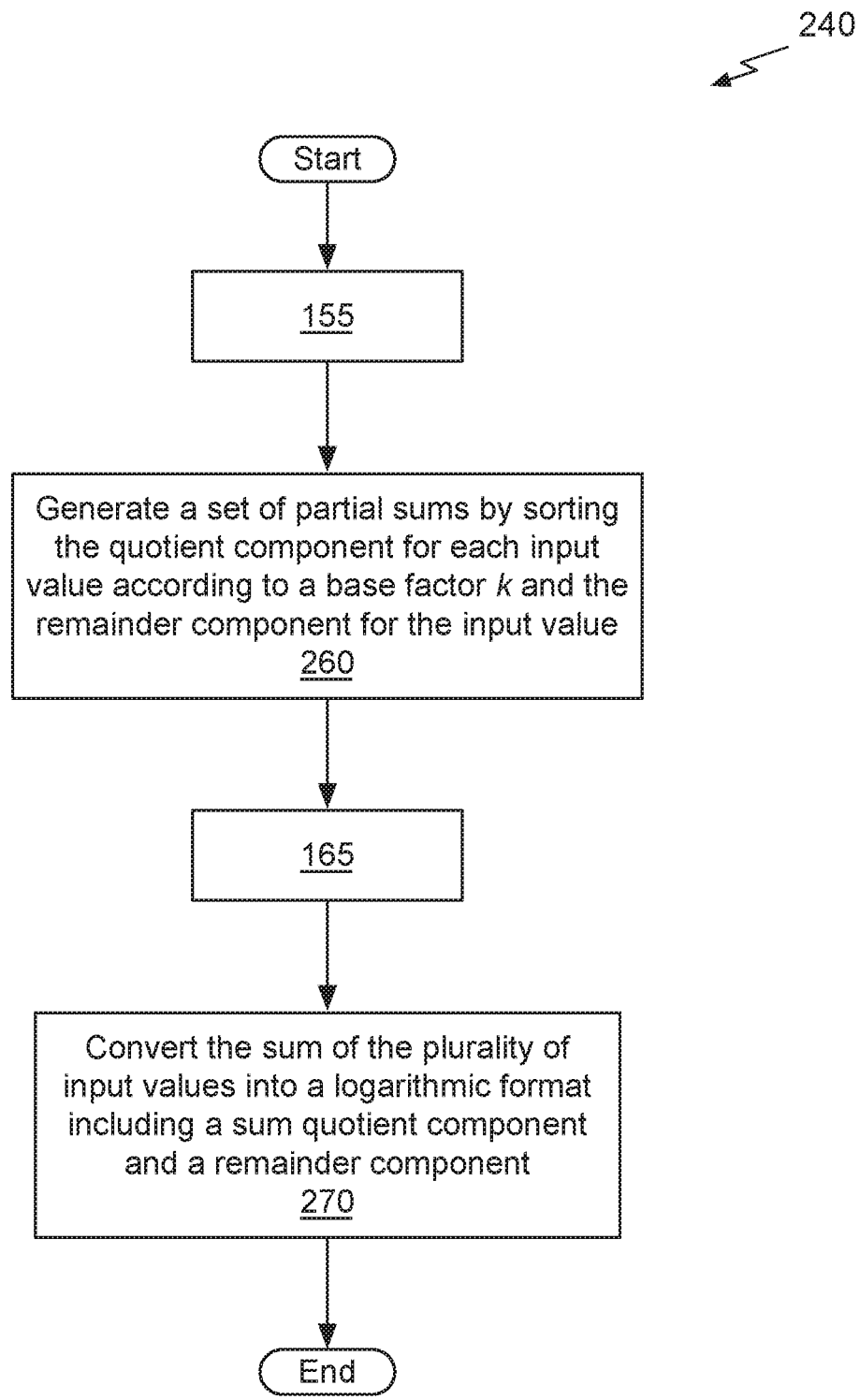
FIG. 2D illustrates a flowchart of a method for accumulating input values represented in a logarithmic format using an approximation technique, in accordance with an embodiment.

FIG. 2D illustrates a flowchart of a method 240 for accumulating values represented in a logarithmic format using the hybrid approximation technique, in accordance with an embodiment. Although method 240 is described in the context of a processing unit, the method 240 may also be performed by a program, custom circuitry, or by a combination of custom circuitry and a program. For example, the method 240 may be executed by a GPU (graphics processing unit), CPU (central processing unit), or any processor capable of computing a sum of input values in logarithmic format. Furthermore, persons of ordinary skill in the art will understand that any system that performs method 240 is within the scope and spirit of embodiments of the present disclosure.

At step 155, a plurality of input values is received for an addition computation. Each input value in the plurality of values is represented as a quotient component $e_q$ and a remainder component $e_r$, such that each input value $$v = s2^{\left(e_q + \frac{e_r}{n}\right)},$$

where n is an integer. In an embodiment, the input values are received by the partial sums generation unit 205. In an embodiment, each remainder component $e_r$ is separated into a most-significant bit (MSB) portion $e_{rM}$ and a least-significant bit (LSB) portion $e_{rL}$, or subset, including at least one or more LSBs. When each remainder component is separated $$\frac{e_r}{n} = \frac{e_{rM}}{n} + \frac{e_{rL}}{k}$$

and each input value $$v = s2^{\left(e_q + \frac{e_{rM}}{n} + \frac{e_{rL}}{k}\right)}.$$

At step 260, a set of partial sums is generated by sorting the quotient component for each input value according to the remainder component for the input value. In an embodiment, the sorting unit 110 distributes the input quotient components according to the MSB portion, $e_{rM}$, of the input remainder components. In an embodiment, the partial sums generation unit 205 generates the set of partial sums. In an embodiment, the LSB portion of the input remainder components, $e_{rL}$, are divided by the base factor k and multiplied by the scale factor c to compute the approximated values. In an embodiment, the approximated values are left-shifted by the quotient component, $(1+cx)\ll e_q$, to produce modified quotient component contributions that are accumulated for all of the input values to produce partial sums. In an embodiment, each partial sum is multiplied by a respective remainder component MSB portion to produce the set of partial sums.

At step 165, the partial sums in the set of partial sums are summed to produce a sum of the plurality of input values. In an embodiment, the addition unit 125 receives the set of partial sums and produces the sum. Postponing multiplying by the remainder MSB portion until after the partial sums are accumulated reduces the number of bits toggled. At step 270, the sum of the plurality of input values is converted into logarithmic format including a sum quotient component and remainder component by the conversion unit 130.

Logarithmic-based arithmetic may be used to reduce area and energy consumption, particularly for neural network computations requiring many multiplications and summing of products. Multiplication of logarithmic format values is straightforward and energy efficient as the exponents are simply added. In contrast, performing addition on logarithmic format values is more complex. For addition operations, the exponents of logarithmic format values may be decomposed into separate quotient and remainder components for processing by the system 100, 155, and/or 215 to produce a sum in integer or logarithmic format.

Summing the contribution of quotient component values sorted according to common exponent remainder components greatly simplifies the addition process. For example, only a single lookup and multiply by constant is needed per partial sum to compute the set of partial sums, rather than multiplying each quotient component contribution by the remainder for each input value. The summation algorithm implemented by the system 100, 155, and/or 215 reduces bit toggling compared with conventional techniques. Furthermore, the hybrid approximation technique implemented by the system 215 may be used to improve energy efficiency by limiting the number of partial sum accumulators 120 even when the number of bits used to represent the remainder is increased to improve accuracy.

The system 100, 155, and/or 215 may be used to perform dot product and multiply accumulate functions that are core math functions for linear algebra involved in deep learning inference or training systems. The logarithmic-based arithmetic implemented by the system 100, 155, and/or 215 is particularly well-suited for deep learning inference tasks, such as image classification, object detection, segmentation, and the like, because low-precision number representations can be used while also maintaining computational accuracy.

Parallel Processing Architecture

Figure 3:
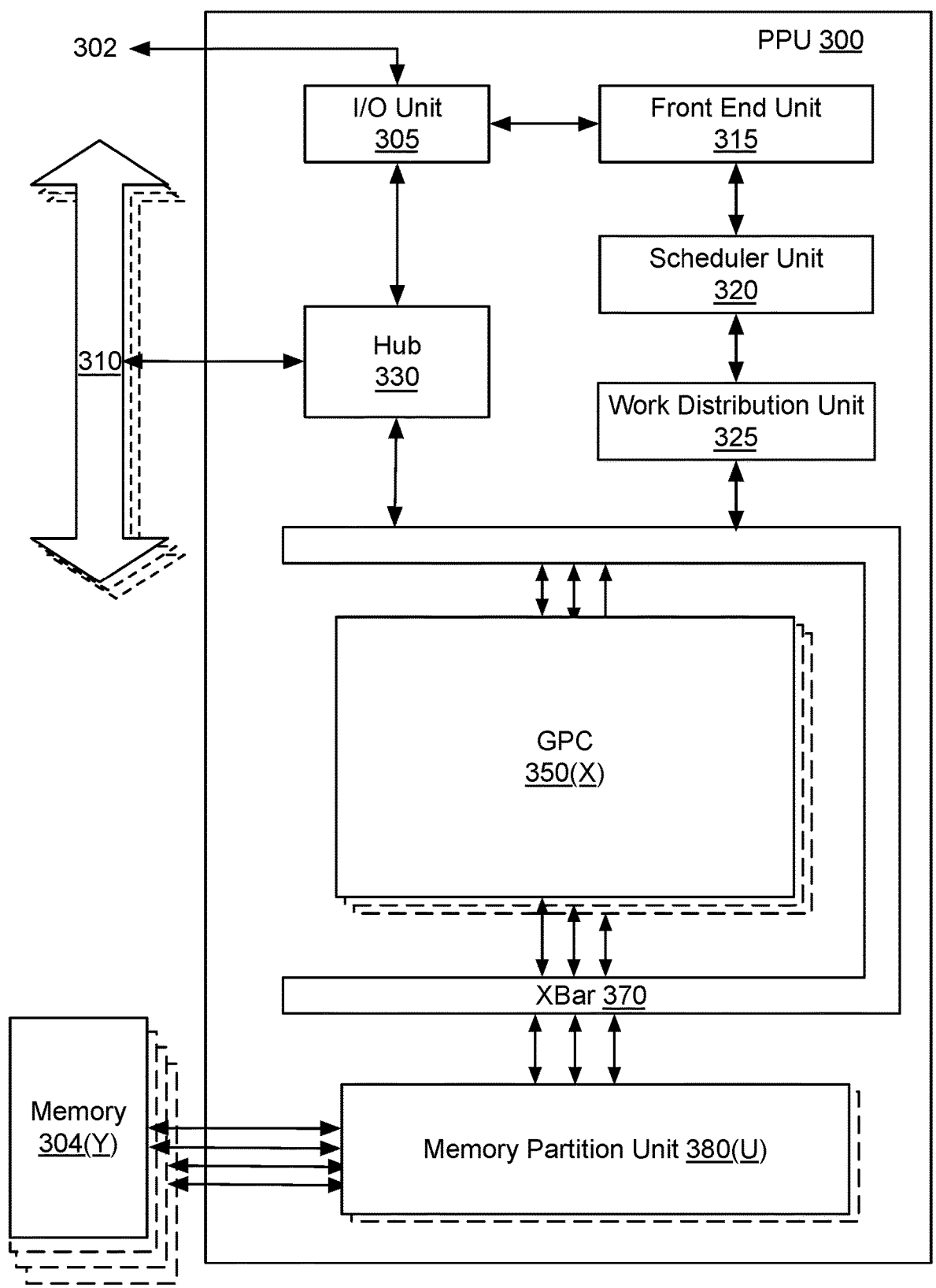
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5C.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
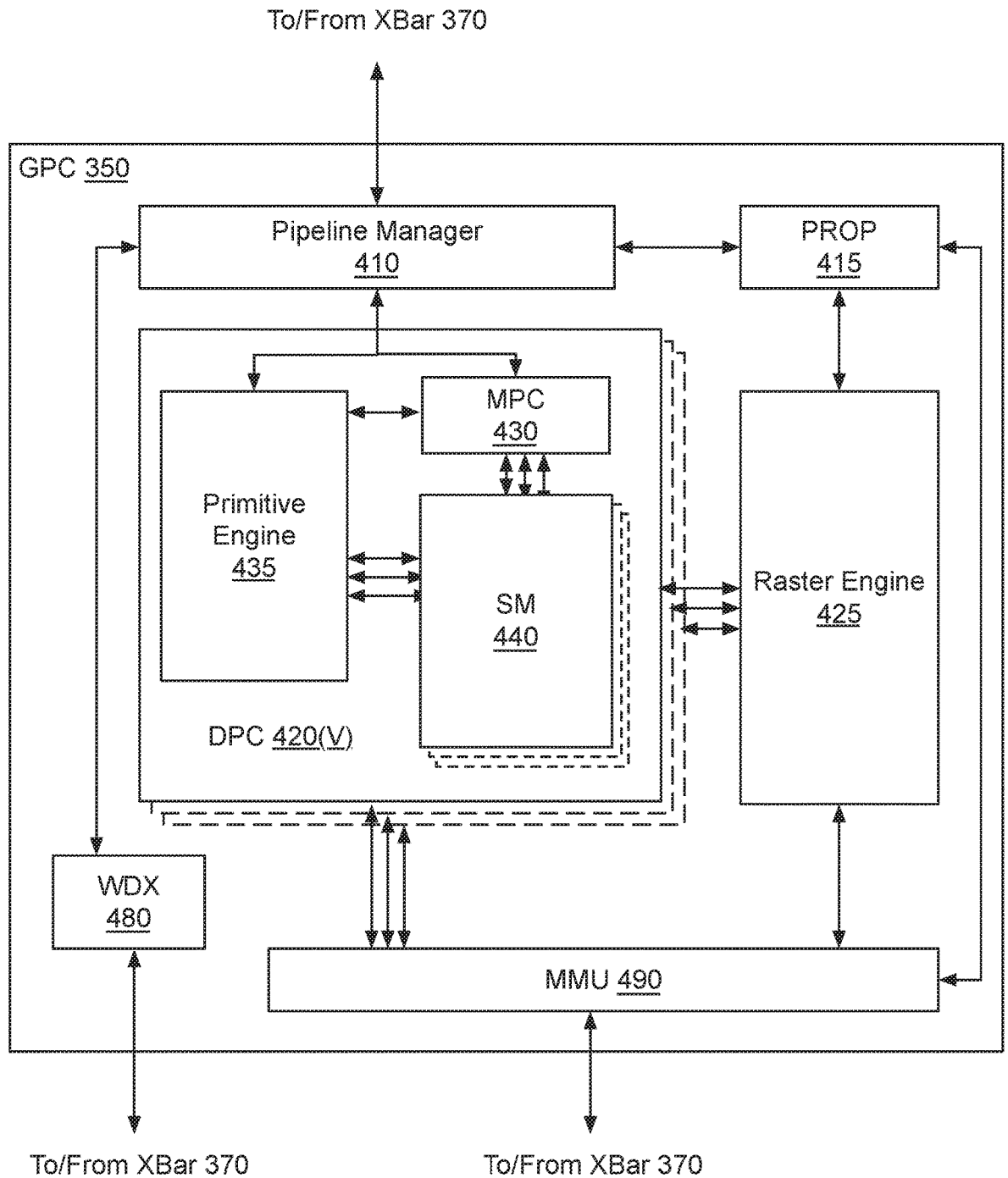
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
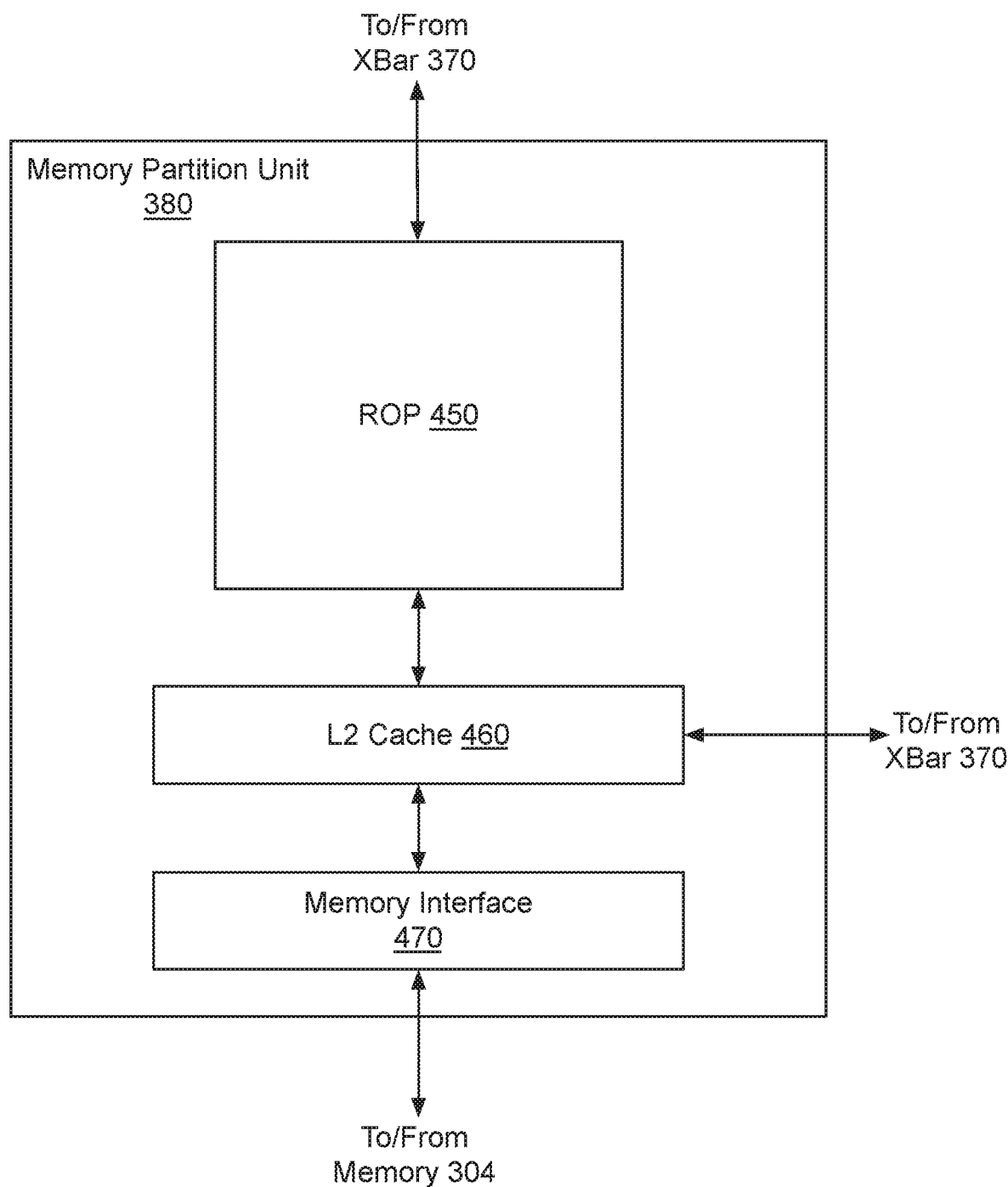
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
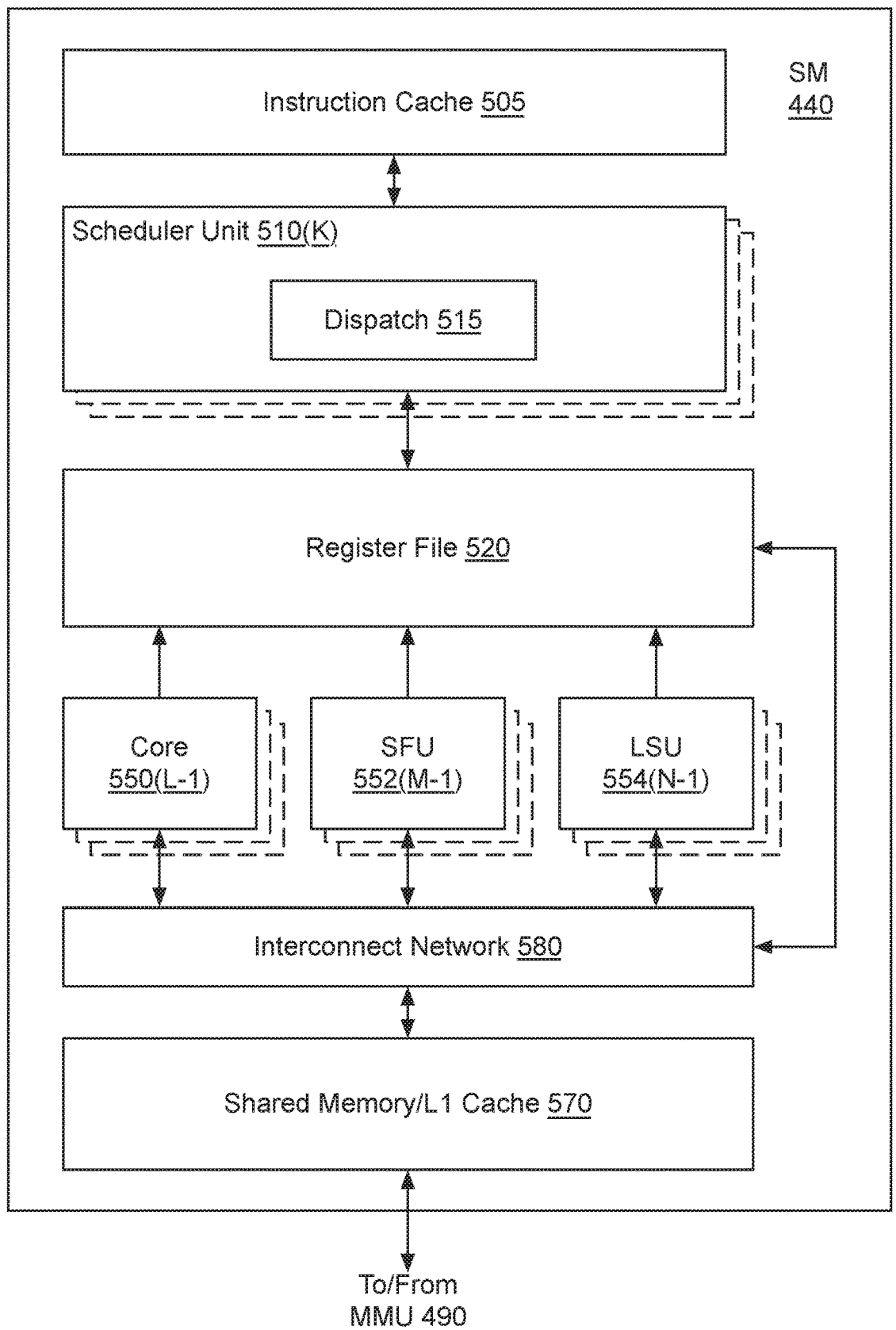
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In an embodiment, the Tensor cores are configured to perform matrix multiply operations on values represented in a logarithmic format. In an embodiment, one or more of the cores 550 is implemented using at least a portion of the system 100, 115, or 215, such as the partial sums generation 105 or 205, addition unit 125, and conversion unit 130. Partial sums and sums may be computed for values represented in a logarithmic format to efficiently perform dot product operations, multiply accumulate operations, sum of product operations, and convolution operations for neural network training and inferencing. More specifically, the partial sums generation 105 or 205, addition unit 125, and conversion unit 130 may be used to reduce energy consumption and satisfy accuracy requirements compared with using conventional techniques. The logarithmic format is particularly suitable for deep learning inferencing because low-precision number representations can be used with minimal or no loss of accuracy. For example, the system 100, 115, or 215 using the logarithmic format may be used to compute energy-efficient dot products with low-precision numbers for voice, language, image, video processing, and the like. Dot products are the core math computation needed for linear algebra involved in deep learning inference or training workloads. Therefore, the system 100, 115, or 215 may be used to perform dot product computations for deep learning systems.

In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

Figure 5B:
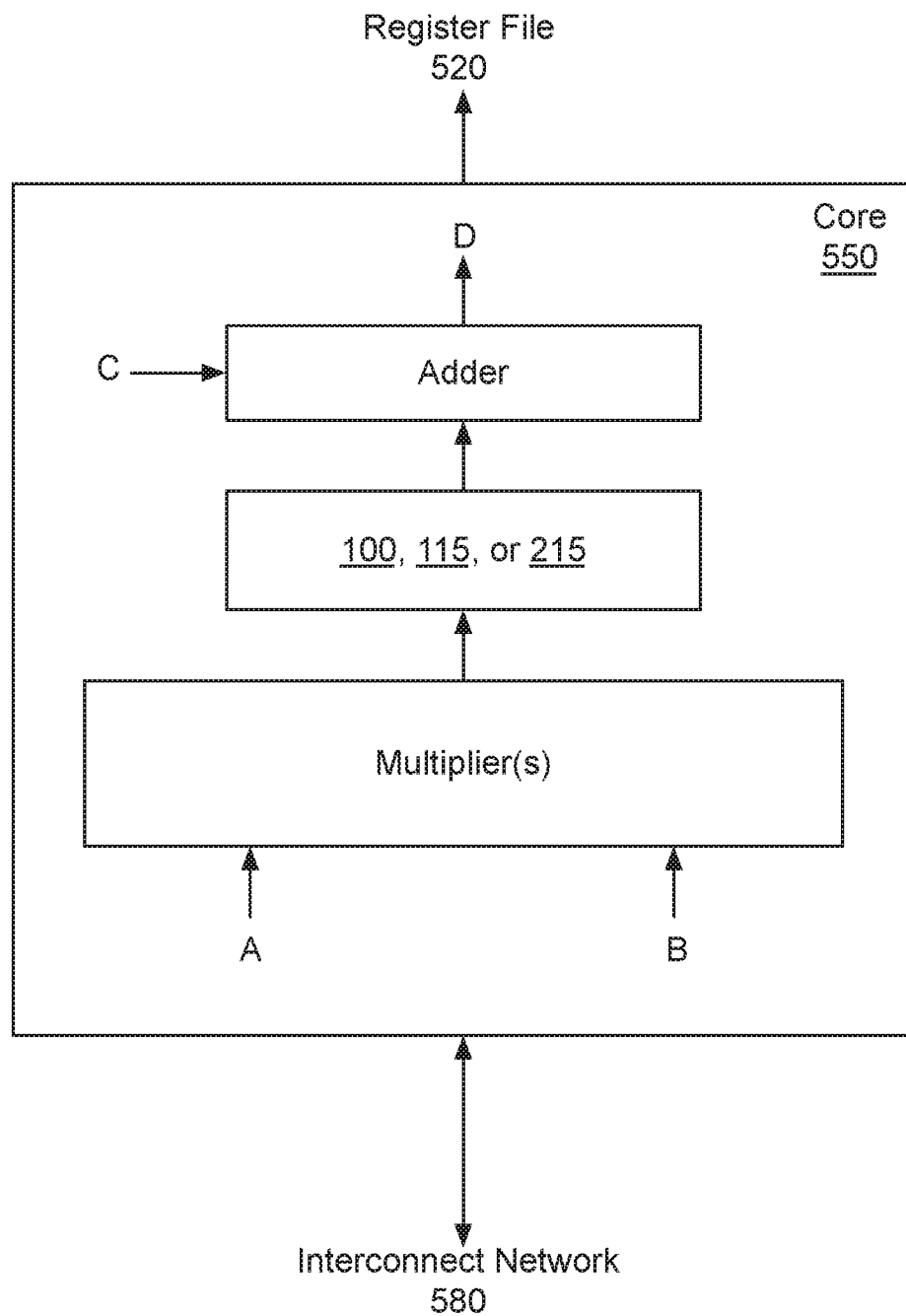
FIG. 5B illustrates the processing core, of FIG. 5A, in accordance with an embodiment.

FIG. 5B illustrates the processing core 550, of FIG. 5A, in accordance with an embodiment. The core 550 includes multiplier(s), the system 100, 115, or 215, and an adder. In an embodiment, the multiplier(s) receive input matrices A and B represented in logarithmic format and output products to the system 100, 115, or 215 to accumulate the products for a multiply-accumulate operation, generating a result matrix. In an embodiment, elements of the result matrix are added with elements of the matrix C by the adder. In an embodiment, the adder is implemented as a system 100, 115, or 215. In an embodiment, the core 550 is configured to perform a 4×4×4 matrix multiply and much larger two-dimensional or higher dimensional matrix operations are performed by decomposing the larger matrices. Results of the matrix operations may be used to perform one or more functions for HPC, data center, and machine learning applications. In particular, the system 100, 115, or 215 may be configured to accelerate matrix and vector arithmetic for deep learning systems and applications. For example, the system 100, 115, or 215 may be configured to perform convolution operations for one or more layers of a neural network during training or inferencing for tasks including, but not limited to, classification, object detection, segmentation, clustering, and regression.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC)

CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5C:
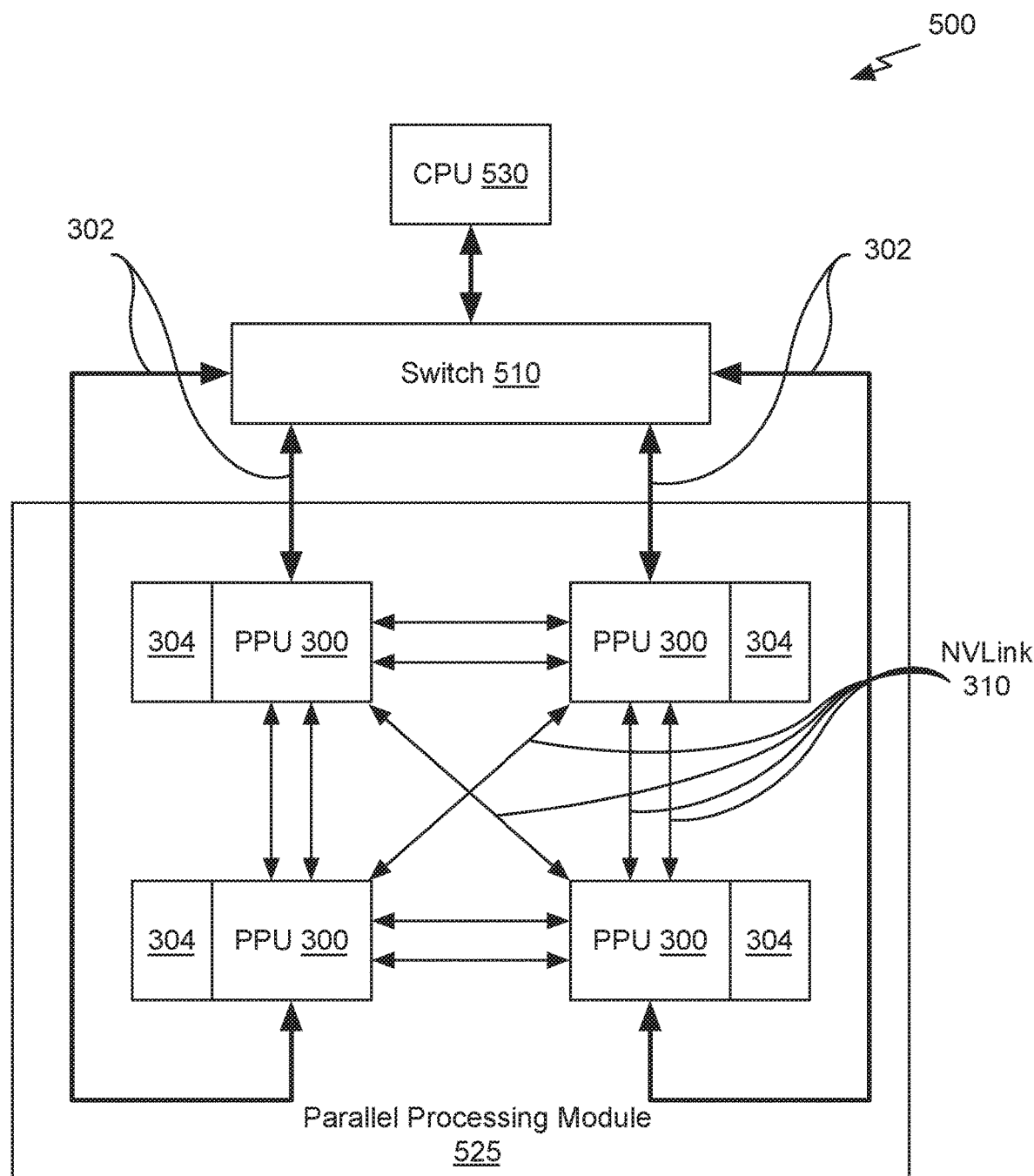
FIG. 5C is a conceptual diagram of a processing system implemented using the PPU of FIG. 3, in accordance with an embodiment.

FIG. 5C is a conceptual diagram of a processing system 500 implemented using the PPU 300 of FIG. 3, in accordance with an embodiment. The exemplary system 565 may be configured to implement the method 150 shown in FIG. 1C or the method 240 shown in FIG. 2D. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5C, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5C, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5C, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5D:
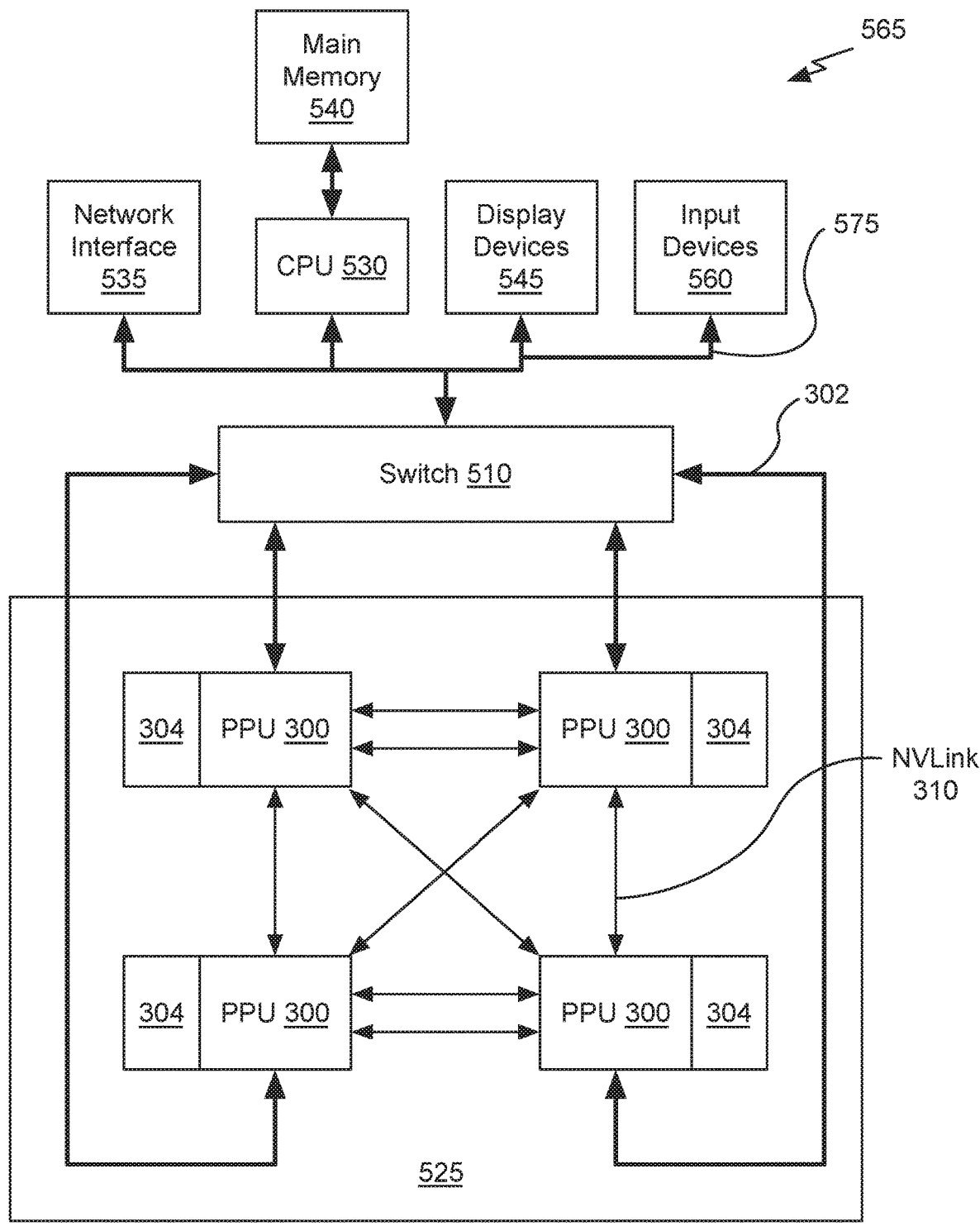
FIG. 5D illustrates an exemplary system in which the various architecture and/or functionality of the various previous embodiments may be implemented.

FIG. 5D illustrates an exemplary system 565 in which the various architecture and/or functionality of the various previous embodiments may be implemented. The exemplary system 565 may be configured to implement the method 150 shown in FIG. 1C or the method 240 shown in FIG. 2D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. A loss function is computed based on differences between the correct label and the predicted label. During a backward propagation phase, partial derivative of the loss function are propagated back through the DNN and the weights are adjusted for each feature to improve the accuracy of the DNN. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on tensor math operations, and complex multi-layered networks require tremendous amounts of floating-point performance and bandwidth for both efficiency and speed. With thousands of processing cores, optimized for tensor math operations, and delivering tens to hundreds of TFLOPS of performance, the PPU 300 is a computing platform capable of delivering performance required for deep neural network-based artificial intelligence and machine learning applications. The system 100, 115, or 215 may be configured to perform the tensor math operations.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving, a plurality of input values comprising image or sound data at a tensor core within a processor, wherein each input value in the plurality of input values is represented as a sign s, a quotient component $e_q$, and a remainder component $e_r$, such that each input value $$v = s2^{(e_q + \frac{e_r}{n})},$$

where n is an integer,
   the tensor core is configured to implement at least one layer of a neural network model, and
   the at least one layer processes the plurality of input values by:
   generating a set of partial sums by sorting the quotient component for each input value according to the remainder component for the input value; and
   summing the partial sums in the set of partial sums to produce a result that is a sum of the plurality of input values, wherein the result corresponds to an output of the neural network model that encodes at least one of classification, object detection, segmentation, clustering, or regression for the plurality of input values.

2. The computer-implemented method of claim 1, wherein the quotient components are routed into n separate accumulators to generate the set of partial sums.

3. The computer-implemented method of claim 2, wherein the generating comprises, for each quotient component, shifting a binary one by the quotient component to produce a quotient contribution input to one of the n separate accumulators.

4. The computer-implemented method of claim 3, wherein the quotient contributions input to each one of the n separate accumulators are accumulated to produce the set of partial sums.

5. The computer-implemented method of claim 4, further comprising, before summing the partial sums, scaling each partial sum in the set of partial sums by a constant corresponding to the accumulator that produced the partial sum.

6. The computer-implemented method of claim 1, further comprising converting the sum of the plurality of input values into a logarithmic format including a sum quotient component and a sum remainder component.

7. The computer-implemented method of claim 6, wherein the converting comprises:
   determining the sum quotient component based on a position of a leading one within the sum; and
   quantizing a portion of the sum including the leading one and less significant bits of the sum to produce the sum remainder component.

8. The computer-implemented method of claim 7, wherein the quantizing comprises comparing the portion of the sum with a set of midpoints between pairs of possible remainder component values.

9. The computer-implemented method of claim 1, wherein the set of partial sums is generated by sorting the quotient component for each input value according to at least one or more most-significant bits of the remainder component for the input value.

10. The computer-implemented method of claim 9, wherein a subset of the remainder component includes at least one or more least-significant bits and the subset of the remainder component is divided by a base factor k and summed with one to generate the partial sums.

11. The computer-implemented method of claim 10, wherein the subset of the remainder component is used to select one entry of a number of entries equal to each possible value of the subset of the remainder component to read a value equal to the subset of the remainder component divided by a base factor k summed with one.

12. The computer-implemented method of claim 9, wherein a subset of the remainder component includes at least one or more least significant bits and the subset of the remainder component is divided by a base factor k and multiplied by a scale factor c to produce a product that is added to one to generate the partial sums.

13. The computer-implemented method of claim 9, wherein the quotient components are routed into n separate accumulators to generate the set of partial sums.

14. The computer-implemented method of claim 1, wherein the plurality of input values are products computed as part of a convolution operation.

15. The computer-implemented method of claim 1, wherein n is a power of two.

16. A system, comprising:
a memory storing a plurality of input values comprising image or sound data, wherein each input value in the plurality of input values is represented as a sign s, a quotient component $e_q$, and a remainder component $e_r$, such that each input value $$v = s2^{(e_q + \frac{e_r}{n})},$$

where n is an integer; and
a processor comprising:
a tensor core configured to implement at least one layer of a neural network model, wherein the at least one layer processes the plurality of input values by:
receiving the plurality of input values;
generating a set of partial sums by sorting the quotient component for each input value according to the remainder component for the input value; and
summing the partial sums in the set of partial sums to produce a result that is a sum of the plurality of input values, wherein the result corresponds to an output of the neural network model that encodes at least one of classification, object detection, segmentation, clustering, or regression for the plurality of input values.

17. The system of claim 16, wherein the partial sums generation unit comprises a sorting unit configured to route the quotient components into n separate accumulators to generate the set of partial sums.

18. The system of claim 17, wherein the processor is further configured to generate the set of partial sums by, for each quotient component, shift a binary one by the quotient component to produce a quotient contribution input to one of the n separate accumulators.

19. A processor comprising:
a tensor core configured to implement at least one layer of a neural network model, wherein the at least one layer processes a plurality of input values comprising image or sound data by:
receiving the plurality of input values, wherein each input value in the plurality of input values is represented as a sign s, a quotient component $e_q$, and a remainder component $e_r$, such that each input value $$v = s2^{(e_q + \frac{e_r}{n})},$$

where n is an integer; and
generating a set of partial sums by sorting the quotient component for each input value according to the remainder component for the input value; and
summing the partial sums in the set of partial sums to produce a result that is a sum of the plurality of input values, wherein the result corresponds to an output of the neural network model that encodes at least one of classification, object detection, segmentation, clustering, or regression for the plurality of input values.

20. The processor of claim 19, wherein the tensor core comprises a sorting unit configured to route the quotient components into n separate accumulators to generate the set of partial sums.

* * * * *